United States Patent [19]
Smith et al.

[11] Patent Number: 5,864,777
[45] Date of Patent: Jan. 26, 1999

[54] METHOD OF PREDICTING VOLUME OF FINISHED COMBUSTION CHAMBERS FROM A RAW CYLINDER HEAD CASTING

[75] Inventors: Gregory Hugh Smith; Vijitha Senaka Kiridena, both of Ann Arbor; Samuel Edward Ebenstein; Yelena Mordechai Rodin, both of Southfield, all of Mich.

[73] Assignee: Ford Global Technologies, Inc., Dearborn, Mich.

[21] Appl. No.: 787,506

[22] Filed: Jan. 21, 1997

[51] Int. Cl.⁶ .............................. G06F 19/00; G06F 17/00
[52] U.S. Cl. .................... 702/156; 364/578; 364/468.01; 364/468.04; 364/468.24; 364/472.02
[58] Field of Search .................................. 364/564, 578, 364/550, 551.01, 552, 468.01, 468.02, 468.04, 468.09, 468.15, 468.16, 468.17, 468.24, 472.01, 472.02, 472.06, 474.01, 474.02, 474.16, 475.02, 475.09; 395/500, 86, 527; 123/193.5, 41.82 R; 33/1 V; 73/861; 356/379, 380; 702/156

[56] References Cited

U.S. PATENT DOCUMENTS

| | | | |
|---|---|---|---|
| 4,559,684 | 12/1985 | Pryor | 29/156.4 R |
| 4,774,751 | 10/1988 | Pryor | 29/407 |
| 5,012,574 | 5/1991 | Pryor | 29/888.06 |
| 5,112,131 | 5/1992 | Pryor | 356/376 |
| 5,442,572 | 8/1995 | Kiridena et al. | 364/560 |
| 5,517,311 | 5/1996 | Takeuchi et al. | 356/376 |
| 5,546,328 | 8/1996 | Kiridena et al. | 364/552 |
| 5,659,493 | 8/1997 | Kiridena et al. | 364/578 |
| 5,691,909 | 11/1997 | Frey et al. | 364/474.01 |

OTHER PUBLICATIONS

Xiao et al., "Virtual Machining Environment—GMPS", Proceedings of the 1996 IEEE Conference on Emerging Technologies and Factory Automation, pp. 167–171, Feb. 1996.

*Primary Examiner*—John Barlow
*Assistant Examiner*—Patrick Assouad
*Attorney, Agent, or Firm*—Joseph W. Malleck, Esq.; Roger L. May, Esq.

[57] ABSTRACT

A method of predicting volume of finished combustion chambers from a raw cylinder head casting including the steps of capturing cylinder head geometry of a raw cylinder head casting, transforming the captured cylinder head geometry into a machining coordinate system, virtual machining the raw cylinder head casting based on the transformed geometry, calculating a volume of combustion chambers of the virtually machined cylinder head, adding signed volumes of at least one component to the calculated volume to obtain a finished volume, and adjusting a mold for the raw cylinder head casting to achieve the desired finished volume.

9 Claims, 2 Drawing Sheets

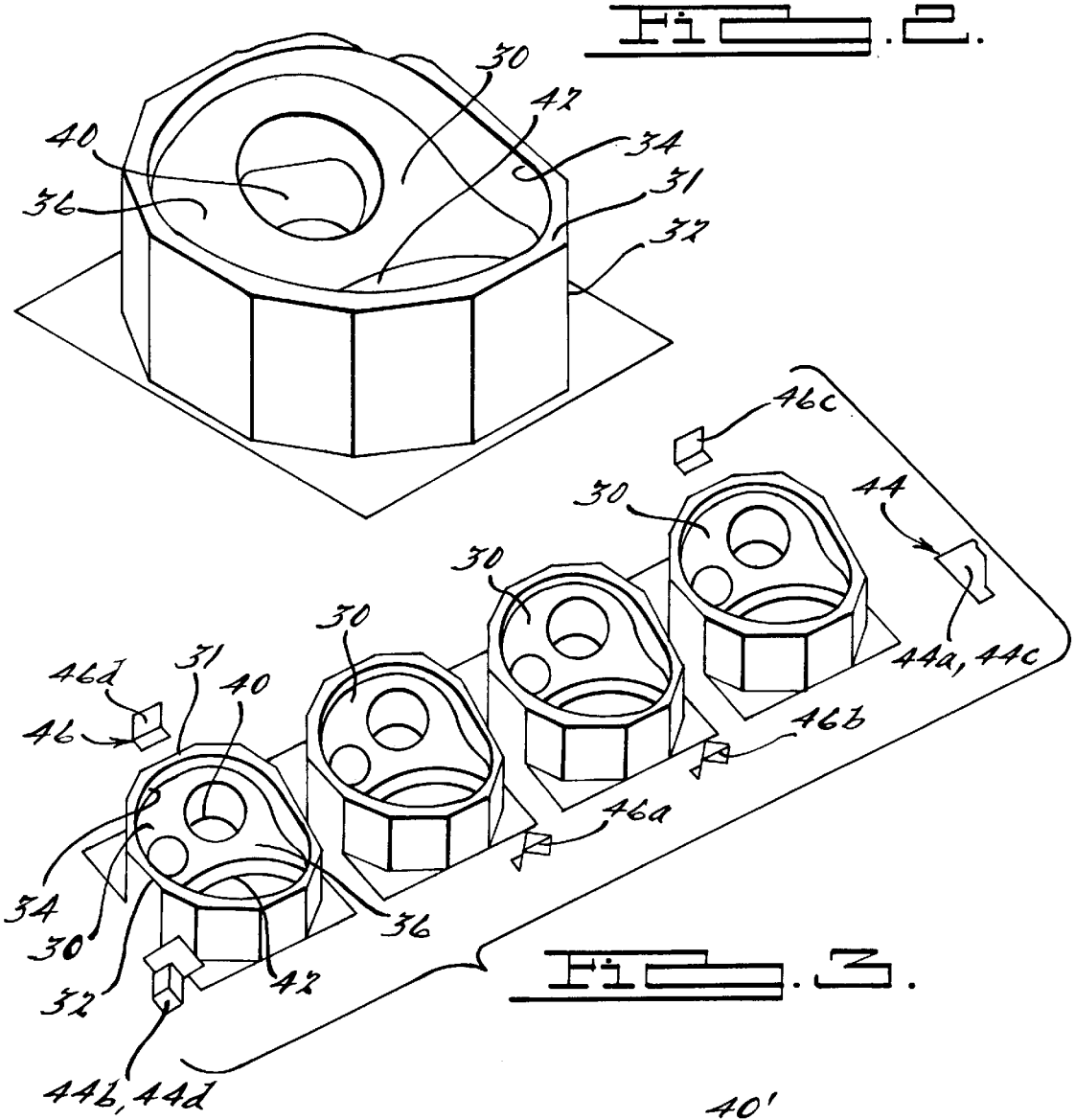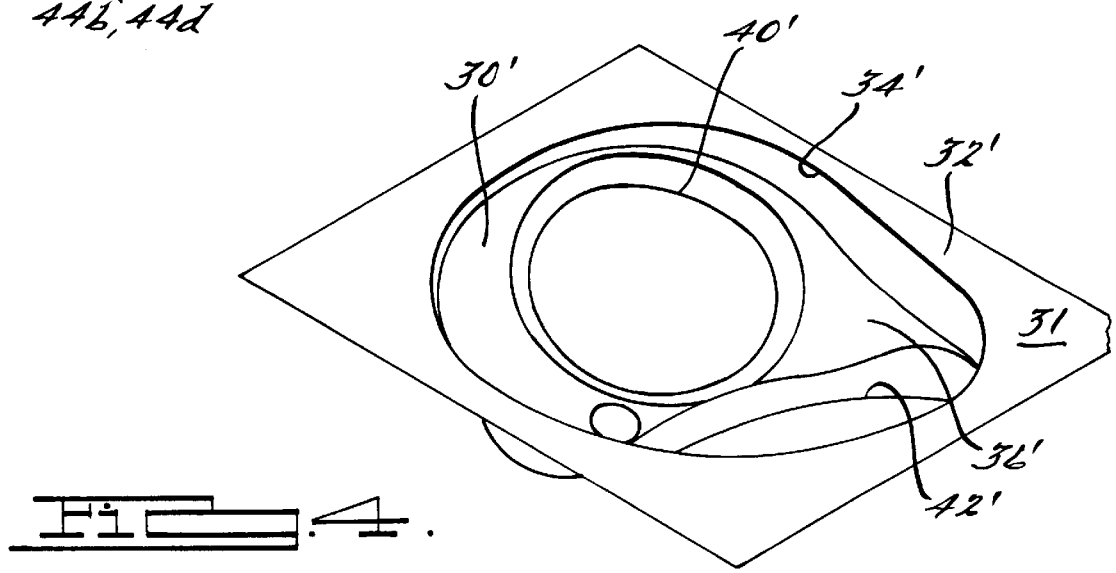

METHOD OF PREDICTING VOLUME OF FINISHED COMBUSTION CHAMBERS FROM A RAW CYLINDER HEAD CASTING

BACKGROUND OF THE INVENTION

1. Field of the Invention

The present invention relates generally to internal combustion engines and, more specifically, to a method of predicting the volume of finished combustion chambers from a raw cylinder head casting for an internal combustion engine.

2. Description of the Related Art

It is known to cast a cylinder head for an internal combustion engine. The cylinder head has at least one, sometimes a plurality of combustion chambers. The raw cylinder head casting is typically finished by machining the deck face and valve seat surfaces to prepare it for installation of spark plugs and valves.

It is also known that variations in the volume of the combustion chamber have a strong effect on the variation of the compression ratio of each cylinder. Differences in compression ratio between cylinders of the same engine lead to engine noise vibration harshness (NVH). Differences in compression ratio among engines of the same family require using a less than optimum engine calibration for the engine, in order to meet emissions, which reduces power and adversely affects fuel economy. Thus, it is desirable to know and control the volume of a combustion chamber for a finished cylinder head.

The most common method for measuring the volume of a combustion chamber is to first perform the finish machining and then measure the volume of liquid required to fill the chamber. The method involves covering the combustion chamber with a glass plate having a small hole therethrough. The combustion chamber is carefully filled with liquid, which is accurately measured. Another method uses sonic resonance to compare a test chamber to a master chamber. Both of these methods only measure the volume of combustion chambers and are laborious and lack repeatability. Further, neither of these methods will work with a cylinder head as casted, since they require a totally enclosed volume, i.e. the combustion chamber must contain both valves and spark plug. By knowing the finished volume at the time of casting, it is possible to adjust the casting process to repeatably produce the desired volume. Thus, there is a need in the art to predict the volume of a finished combustion chamber from a raw cylinder head casting.

SUMMARY OF THE INVENTION

Accordingly, the present invention is a method of predicting volume of finished combustion chambers from a raw cylinder head casting. The method includes the steps of capturing cylinder head geometry of a raw cylinder head casting, transforming the captured cylinder head geometry into a machining coordinate system, virtual machining the raw cylinder head casting based on the transformed geometry, calculating volume of each of the combustion chambers of the virtually machined cylinder head, adding signed volumes of at least one component to the calculated volume to obtain a finished volume, and adjusting a mold for the raw cylinder head casting to achieve the desired finished volume.

One advantage of the present invention is that a method is provided for predicting the volume of finished combustion chambers from a raw cylinder head casting. Another advantage of the present invention is that the method uses computer techniques to simulate the machining operations which produce the finished cylinder head. Yet another advantage of the present invention is that the method can be used to determine if a combustion chamber volume is out of tolerance due to errors from the casting process independent of any variation in the machining process. Still another advantage of the present invention is that the method can be used to provide process feedback to adjust the desired finished volume value and assess process variability. A further advantage of the present invention is that the method is more accurate and repeatable than previous methods for measuring the volume of machined or finished cylinder heads.

Other features and advantages of the present invention will be readily appreciated as the same becomes better understood after reading the subsequent description when considered in connection with the accompanying drawings.

BRIEF DESCRIPTION OF THE DRAWINGS

FIG. 2 is a high density point perspective view of a raw combustion chamber of a raw cylinder head casting.

FIG. 3 is a high density point perspective view of a raw cylinder head casting including cast datum locating features.

FIG. 4 is a high density point perspective view of a finished combustion chamber of a finished cylinder head after a spark plug and the valve have been added and a deck face and valve seat has been machined.

DESCRIPTION OF THE PREFERRED EMBODIMENT(S)

Figure 1:
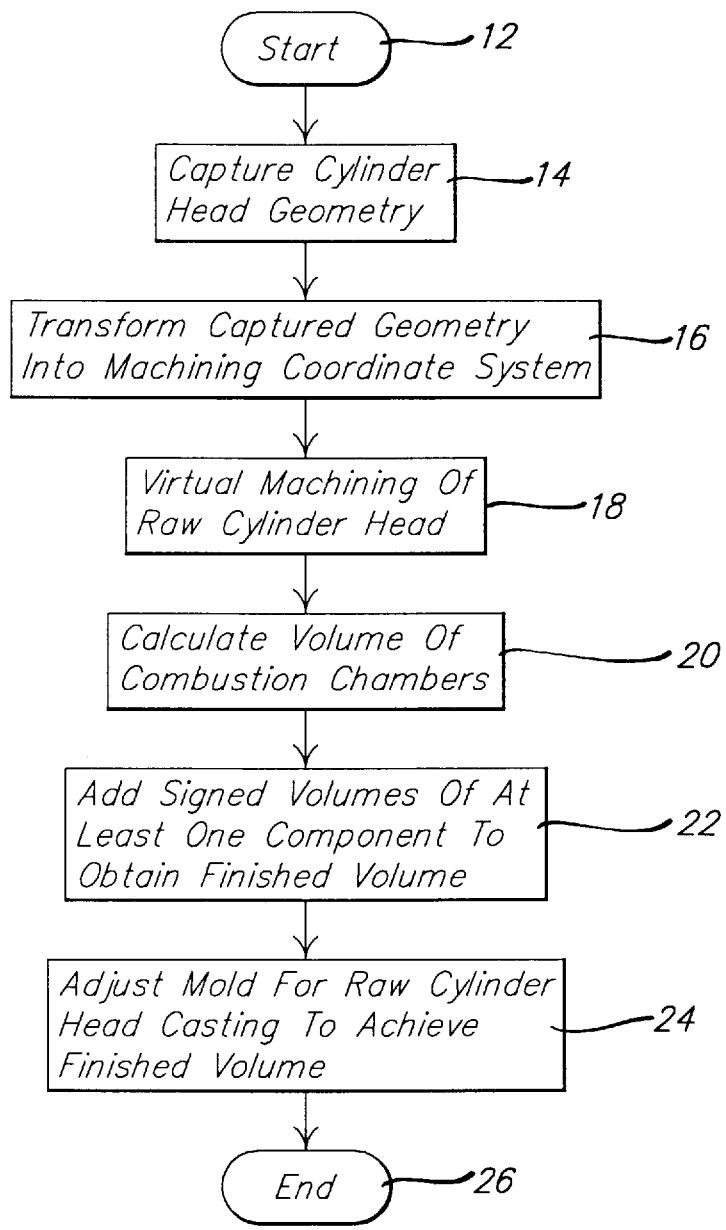
FIG. 1 is a flowchart of a method, according to the present invention, of predicting the volume of finished combustion chambers in a raw cylinder head casting.

One embodiment of a method, according to the present invention, of predicting volume of finished combustion chambers from a raw cylinder head casting for an internal combustion engine is illustrated in FIG. 1. The method starts in bubble 12 and includes capturing cylinder head geometry of a raw cylinder head casting in block 14, transforming the captured cylinder head geometry into a machining coordinate system in block 16 and virtual machining the raw cylinder head casting based on the transformed geometry in block 18. The method also includes calculating a volume of each of the combustion chambers of the virtually machined cylinder head in block 20, adding signed volumes of at least one component to the calculated volume to obtain a finished volume in block 22 and adjusting a mold for the raw cylinder head casting to achieve the desired finished volume in block 24. The method ends in bubble 26.

In block 14, the method includes the step of capturing the cylinder head geometry of a raw cylinder head casting for an internal combustion engine (not shown). As illustrated in FIGS. 2 and 3, at least one, or a plurality of cast combustion chambers 30 in a deck face 31 of a raw cylinder head casting 32 are illustrated. Each combustion chamber 30 has cast combustion chambers surfaces 34 and 36. Each combustion chamber 30 also has a recess 40 for at least one component such as a spark plug (not shown) and a recess 42 for at least one component such as a valve. It should be appreciated that the raw combustion chamber 30 is conventional and known in the art.

To capture the geometry of the raw combustion chamber 30, a laser scanner or other suitable means is used to collect a dense cloud of x,y,z data points which represent the geometry of the cast combustion chamber surfaces 34,36, 40,42. For example, a laser scanner can be used to collect a cloud of x,y,z data points every 0.5 millimeters (mm) in both the x and y directions across the raw combustion chamber 30. This dense cloud of point data is used as an input to a computer (not shown) for the purpose of volume calculation. In the example, the scan density is sufficient to compute the volume to within 0.05 cubic centimeters (cc). It should be appreciated that laser scanning and inputting to a computer is conventional and known in the art.

In block 14, the step of capturing includes capturing the geometry of cast datums which define the orientation and position of a cast coordinate system for the raw cylinder head casting 32. As illustrated in FIG. 2, the raw cylinder head casting 32 includes x,y locators or cast datums 44 and z locators or cast datums 46 which are cast into the raw cylinder head casting 32 by a mold (not shown). It should be appreciated that the cast datums 44 and 46 define the orientation and position of a cast coordinate system.

To capture the cast datums 44 and 46, a laser scanner or other suitable means is used. The relationship between the coordinate system in which the chamber geometry is captured and the coordinate system in which the cast datum geometry is captured must be known. Preferably, these coordinate systems are the same because the same laser scanner can be used to capture the combustion chamber geometry and cast datums simultaneously.

In block 16, the method includes the step of transforming the captured geometry into a machining coordinate system. In order to define the finished geometry and predict the finished volume, measurements and dimensions in three separate coordinate systems, cast, inspection and machining must be related. The cast coordinate system defines the orientation of the raw cylinder head casting 32 in its cast condition.

The cloud of measurement data which represents the cast surfaces 34,36,40,42 is obtained in an inspection coordinate system and finish machining of the surface 42 for the valve seat and deck face 31 are done in the machining coordinate system. Preferably, the machining coordinate system is chosen as the common system and the transformation matrices from the two other systems to this common system are determined. The cast coordinate system is described by physical cast datums 44 and 46 that are cast into the raw cylinder head casting 32. These cast datums 44 and 46 define a plane, a line and a point from which a unique coordinate system may be constructed. By using three dimensional geometric techniques known in the art, the transformation matrix from the inspection coordinate system to the cast coordinate system can be determined from the geometry of the cast datums 44 and 46 in the inspection coordinate system. The cast datums 44 and 46 are used in the first steps of the machining process to locate the machining datums to which all further machining is done. The relationship between the cast coordinate system and the machining coordinate system is defined by cylinder head drawings or a computer aided drafting (CAD) model of the cylinder head. The transformation matrix between the cast and machining coordinate systems can be derived from this given relationship.

Since the transformation matrix from the inspection coordinate system to the cast coordinate system can be determined from the captured geometry of the cast datums 44 and 46, and the transformation matrix from the cast coordinate system to the machining coordinate system is defined by the cylinder head drawings or CAD model, it is possible to determine the transformation matrix that will transform the cloud of x,y,z points in the inspection coordinate system which represent the cylinder head cast surfaces 34,36,40,42 into the machining coordinate system. Once transformed, the data represents the cast cylinder head surfaces 34,36,40, 42 in the machining coordinate system. It should be appreciated that the transformation is carried out by the computer.

For example, a 2.0 L cylinder head has four (4) cast datums 46a,46b,46c,46d on its periphery which are used to define the x,y plane of the cast coordinate system. The geometry of these cast datums 46 were obtained by scanning the raw cylinder head casting 32 in these areas. Because there is insufficient space on the periphery near the center of the raw cylinder head casting 32, four datums 46 are used rather than three. To determine the plane defined by these datums 46, the midpoint of a line segment connecting the centroids of 46a and 46b were used as one point and the centroid of 46c and 46d were used as the other two. There are four (4) other cast datums 44a, 44b, 44c and 44d located at the extreme ends of the raw cylinder head casting 32 which define four planes. Planes 44a and 44b face the positive and negative y direction. Planes 44c and 44d face the positive x direction. The projection of a line segment connecting the centroids of 44c and 44d onto the xy plane defines the cast coordinate system y axis. The centroids of the remaining two planes, 44c and 44d, were used to define the origin. The centroids of these planes were first projected to the yz plane (which is perpendicular to the previously defined xy plane and oriented along the previously defined y axis). These projected points were then projected to the xy plane. The midpoint of the line segment connecting these twice projected points is used to define the origin of the cast coordinate system. Once the cast coordinate system is defined using data from the cast datums 44 and 46, the transformation matrix T1 from the inspection coordinate system in which the data was gathered to the cast coordinate system defined by the cylinder head drawings can be determined.

The transformation matrix T2 from the cast coordinate system to the machining coordinate system, can be determined from the cylinder head drawings. In this example, a simple translation in three dimensions 183.6 mm in the x direction, 4.6 m in the y, and 1.5 mm in the z was used. The transformation matrix T, from the inspection coordinate system to the machining coordinate system, was then determined. The transformation matrix T is the matrix product of T2 times the inverse of matrix T1. Applying this resulting matrix T to the x,y,z point data representing the cast chamber surfaces 34,36,40,42 transforms it into the machining coordinate system.

In block 18, the method includes the step of virtual machining the combustion chambers based on the transformed geometry. By using the coordinate transformation matrix T derived in the previous step, the x,y,z point data is transformed to the machining coordinate system. Virtual machining techniques are used to simulate the finish machining of the raw cylinder head casting 32 at the nominal locations given by the cylinder head drawings or CAD model for the cylinder head. It should be appreciated that only the deck face 31 and recess 42 or valve seat for the valve are machined.

The actual process of applying these machining operations to the model is accomplished by a process called virtual machining, which is described in copending patent application, U.S. Ser. No. 08/398,233, filed Mar. 3, 1995, and entitled "Virtual Machine Techniques for Modifying Computer Models of Parts", the disclosure of which is incorporated by reference. The resulting point model then represents the geometry of the raw cylinder head casting 32 machined or finished to the nominal manufacturing dimensions as illustrated in FIG. 4 where like parts have primed reference numerals.

For example, data on the surface 42' for the valve was brought to a valve gage line to simulate the portion of the combustion chamber 30' sealed off by the valve. The valve seat and blend radiuses were then simulated to their nominal dimensions. Finally, by passing a plane through the data cloud at the nominal location of the deck face 31', the final milling of the cylinder head was simulated. It should be appreciated that the virtual machining is carried out by the computer.

In block 20, the method includes the step of calculating a volume of each of the combustion chambers 30' of the virtually machined cylinder head. By applying three dimensional geometric numerical integration techniques to the point data model from the previous step, the volume of each of the combustion chambers 30' is calculated by using an extension of the trapezoidal rule to three dimensions. The total volume of each combustion chamber 30' is obtained by dividing the chamber 30' into a large number of vertical trapezoidal prisms. The vertices of the base of each trapezoidal prism lie at three adjacent points in the x,y,z point model. The volume of each trapezoidal prism is the area of the projection of its base onto the x,y plane times the average height of the trapezoidal prism. The total volume of the chamber 30' is obtained by summing the volumes of these prisms. It should be appreciated that the calculation is carried out by the computer.

In block 22, the method includes the step of adding signed (+ and –) volumes of at least one component such as a spark plug (not shown) and at least one valve (not shown) to the calculated volume to obtain a finished volume. To determine the finished volume of the combustion chamber 30' (which contains a spark plug and valves), the signed volumes of the valves and spark plug must be added to the calculated volume in the previous step. These signed volumes can be determined by integration of the valve and spark plug geometries stored in the computer. The volume change for the valves and spark plugs added to the chamber 30' is usually given as a significant characteristic on the drawings for these parts. For example, from drawings of these components:

| Intake Valve | volume | +0.425 cc |
| Exhaust Valve | volume | –0.057 cc |
| Plug AGSF34C | volume | –0.114 cc |

These components therefore decrease the total volume calculated by numerical integration by 0.195 cc.

In block 24, the method includes the step of adjusting the mold (not shown) for the raw cylinder head casting 32 to achieve the finished volume. If the predicted or finished volume of the combustion chamber 30' is not on target, the methods of U.S. Pat. No. 5,442,572, entitled "Method and System For Comparing Free-Form Geometries Using High Density Point Data Models", the disclosure of which is hereby incorporated by reference can be used to help identify the root cause of the problem. The error map of U.S. Pat. No. 5,442,572 can be used to determine if the combustion chamber 30 is improperly located in the cylinder head, or if the combustion chamber 30 shape differs from its design intent. This can occur when mold insert for the casting mold wears or mold coating is improperly applied.

The volume of the combustion chamber 30 is adjusted by moving the part of the mold that forms the chamber surface 36 and 38. This part is called the chamber insert and it is moved perpendicular to the deck face 31.

The table below shows the volume for each of the four (4) combustion chambers from a particular cylinder head. The cylinder head was scanned and the data was analyzed by the methods described above. The results appear in the table below. Then the cylinder head was removed from the scanner, replaced, and then rescanned for each trial. The results of the trials differ by less than 0.04 cc in the worst case. Although all the chambers are within tolerance, the methods of U.S. Pat. No. 5,442,572, can be used to help understand the sources of the slight differences between the volumes of each of the chambers.

| Chamber number | Trial 1 | Trial 2 | Trial 3 | Trial 4 | Trial 5 |
|---|---|---|---|---|---|
| 1 | 61.886 | 61.893 | 61.905 | 61.907 | 61.899 |
| 2 | 62.112 | 62.115 | 62.141 | 62.115 | 62.123 |
| 3 | 62.064 | 62.076 | 62.096 | 62.087 | 62.073 |
| 4 | 62.186 | 62.189 | 62.221 | 62.209 | 62.197 |

Accordingly, the present invention provides a method for accurately predicting the volume of a combustion chamber after machining from a raw or cast cylinder head before it has been physically machined. The method simulates machining of the deck face and the chamber surface to prepare it for installation of the spark plug and valves. The chamber volumes are then calculated from the simulated geometry. If the volume is out of tolerance, the method can be used to provide process feedback to determine how to fix the casting process.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of predicting volume of finished combustion chambers from a raw cylinder head casting, the method comprising the steps of:

capturing cylinder head geometry of a raw cylinder head casting including capturing cast datums which define orientation and position of a cast coordinate system for the raw cylinder head casting;

transforming the captured cylinder head geometry into a machining coordinate system;

virtual machining the raw cylinder head casting based on the transformed geometry;

calculating a volume of each combustion chamber of the virtually machined cylinder head;

adding signed volumes of at least one component to the calculated volume to obtain a finished volume; and adjusting a mold for the raw cylinder head casting to achieve the desired finished volume.

2. A method as set forth in claim 1 wherein said step of capturing comprises collecting a cloud of x,y,z data points which represent the geometry of the surface of the combustion chamber.

3. A method as set forth in claim 1 wherein said step of transforming comprises using a transformation matrix to transform x,y,z data of the captured cylinder head geometry from an inspection coordinate system into a machining coordinate system.

4. A method of predicting volume of finished combustion chambers from a raw cylinder head casting, the method comprising the steps of:

capturing cylinder head geometry of a raw cylinder head casting;

transforming the captured cylinder head geometry into a machining coordinate system;

virtual machining the raw cylinder head casting based on the transformed geometry;

calculating a volume of each combustion chamber of the virtually machined cylinder head;

adding signed volumes of at least one component to the calculated volume to obtain a finished volume;

adjusting a mold for the raw cylinder head casting to achieve the desired finished volume; and said step of calculating comprising applying three dimensional geometric numerical integration to a point data model representing the virtually machined combustion chamber.

5. A method of predicting volume of finished combustion chambers from a raw cylinder head casting, the method comprising the steps of:

capturing cylinder head geometry of a raw cylinder head casting;

transforming the captured cylinder head geometry into a machining coordinate system;

virtual machining the raw cylinder head casting based on the transformed geometry;

calculating a volume of each combustion chamber of the virtually machined cylinder head;

adding signed volumes of at least one component to the calculated volume to obtain a finished volume;

adjusting a mold for the raw cylinder head casting to achieve the desired finished volume; and said step of calculating comprising dividing the virtually machined combustion chamber into a plurality of vertical trapezoidal prisms and summing signed integrated volumes of the vertical trapezoidal prisms.

6. A method as set forth in claim 1 wherein said step of adding comprises integrating the at least one component and adding the signed integrated volumes to the calculated volume.

7. A method as set forth in claim 1 wherein said step of adjusting comprises moving a part of the mold that forms the surface of the combustion chamber.

8. A method of predicting volume of finished combustion chambers from a raw cylinder head casting, the method comprising the steps of:

capturing cylinder head geometry of a raw cylinder head casting by collecting a cloud of x,y,z data points which represent the geometry of the surface of the combustion chamber and collecting cast datums which define orientation and position of a cast coordinate system for the raw cylinder head casting;

transforming the captured cylinder head geometry into a machining coordinate system by using a transformation matrix to transform x,y,z data of the captured cylinder head geometry from a cast coordinate system into a machining coordinate system;

virtual machining the raw cylinder head casting based on the transformed geometry;

calculating a volume of each of combustion chambers of the virtually machined cylinder head by applying three dimensional geometric numerical integration to a point data model representing the virtually machined combustion chamber;

adding signed volumes of at least one valve and spark plug to the calculated volume to obtain a finished volume; and adjusting a mold for the raw cylinder head casting to achieve the desired finished volume.

9. A method of predicting volume of finished combustion chambers from a raw cylinder head casting, the method comprising the steps of:

capturing cylinder head geometry of a raw cylinder head casting by collecting a cloud of x,y,z data points which represent the geometry of the surface of the combustion chamber and collecting cast datums which define orientation and position of a cast coordinate system for the raw cylinder head casting;

transforming the captured cylinder head geometry into a machining coordinate system by using a transformation matrix to transform x,y,z data of the captured cylinder head geometry from a cast coordinate system into a machining coordinate system; virtual machining the raw cylinder head casting based on the transformed geometry;

calculating a volume of each of combustion chambers of the virtually machined cylinder head by applying three dimensional geometric numerical integration to a point data model representing the virtually machined combustion chamber;

adding signed volumes of at least one valve and spark plug to the calculated volume to obtain a finished volume; and adjusting a mold for the raw cylinder head casting to achieve the desired finished volume by moving a part of the mold that forms the surface of the combustion chamber.

* * * * *